(12) United States Patent
Gunturu et al.

(10) Patent No.: US 12,538,154 B2
(45) Date of Patent: Jan. 27, 2026

(54) METHODS AND SYSTEMS FOR MANAGING REFLECTING SURFACE

(71) Applicant: SAMSUNG ELECTRONICS CO., LTD., Suwon-si (KR)

(72) Inventors: Anusha Gunturu, Karnataka (IN); Ashok Kumar Reddy Chavva, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 17/870,389

(22) Filed: Jul. 21, 2022

(65) Prior Publication Data

US 2023/0022225 A1    Jan. 26, 2023

(30) Foreign Application Priority Data

Jul. 21, 2021 (IN) .............................. 202141032836
Jul. 7, 2022 (IN) .............................. 2021 41032836

(51) Int. Cl.
*H04W 24/10* (2009.01)
*H04L 5/00* (2006.01)
*H04W 24/08* (2009.01)
*H04W 48/10* (2009.01)

(52) U.S. Cl.
CPC ........... *H04W 24/10* (2013.01); *H04L 5/0048* (2013.01); *H04W 24/08* (2013.01); *H04W 48/10* (2013.01)

(58) Field of Classification Search
CPC ..... H04W 24/10; H04W 24/08; H04W 48/10; H04L 5/0048; H04B 7/04013; H04B 7/088; H04B 7/0695
See application file for complete search history.

(56) References Cited

U.S. PATENT DOCUMENTS 11,528,657 B1 * 12/2022 Mangalvedhe ... H04W 74/0833
2022/0077919 A1 * 3/2022 Li ............................ H04B 7/04
(Continued)

FOREIGN PATENT DOCUMENTS

CN    111245494        6/2020
CN    111245494 A  *  6/2020   ......... H04B 7/04013
(Continued)

OTHER PUBLICATIONS

Intelligent reflecting surface aided wireless communications: A tutorial: Jul. 7, 2020 (Year: 2020).*
(Continued)

*Primary Examiner* — Kwang B Yao
*Assistant Examiner* — Bradley D Lytle, Jr.
(74) *Attorney, Agent, or Firm* — Nixon & Vanderhye P.C.

(57) ABSTRACT

The embodiments herein disclose methods and systems for configuring an reflecting surface. A method by a base station comprises: receiving at least one discovery signal from the reflecting surface; estimating a direction of a panel of the reflecting surface for transmission and reception using at least one spatial information based on the received at least one discovery signal; identifying a set of beam formed reference signals transmitted in the direction of the panel of the reflecting surface; and configuring at least one reference signal to the reflecting surface based on the identified set of beam formed reference signals.

20 Claims, 17 Drawing Sheets

(56) References Cited

U.S. PATENT DOCUMENTS

2022/0231753 A1* 7/2022 Bengtsson ............. H04B 7/145
2022/0407222 A1* 12/2022 Zhu ....................... H04W 24/10

FOREIGN PATENT DOCUMENTS

WO     2020/254031     12/2020
WO     2021/109345     6/2021

OTHER PUBLICATIONS

Indian Examination Report issued Sep. 4, 2023 in corresponding Indian Patent Application No. 202141032836.

Marco Di Renzo et al., "Smart Radio Environments Empowered by Reconfigurable Intelligent Surfaces: How it Works, State of Research, and Road Ahead", Apr. 20, 2020, pp. 1-74, at URL: arXiv:2004.09352v1.

Qingqing Wu et al., "Intelligent Reflecting Surface Aided Wireless Communications: A Tutorial", Jul. 7, 2020, pp. 1-74, at URL: arXiv:2007.02759v2.

Qingqing Wu et al., "Towards Smart and Reconfigurable Environment: Intelligent Reflecting Surface Aided Wireless Network", Aug. 30, 2019, pp. 1-8, as URL: arXiv: 1905.00152v5.

Chongwen Huang et al., "Reconfigurable Intelligent Surfaces for Energy Efficiency in Wireless Communication", Jun. 10, 2019, pp. 1-13, at URL: arXiv:1810.06934v5.

Emil Björnson et al., "Massive MIMO is a Reality—What is Next? Five Promising Research Directions for Antenna Arrays", Jun. 12, 2019, pp. 1-20, at URL: arXiv:1902.07678v2.

Ertugrul Basar et al., "Wireless Communications Through Reconfigurable Intelligent Surfaces", Jun. 22, 2019, pp. 1-19, at URL: arXiv:1906.09490v1.

* cited by examiner

METHODS AND SYSTEMS FOR MANAGING REFLECTING SURFACE

CROSS REFERENCE TO RELATED APPLICATIONS

This application is based on and claims priority under 35 U.S.C. § 119 to Indian Provisional Patent Application Serial No. 202141032836 (PS), filed on Jul. 21, 2021, in the Indian Patent Office, and to Indian Complete Patent Application Serial No. 202141032836 (CS), filed on Jul. 7, 2022, in the Indian Patent Office, the disclosures of which are incorporated by reference herein in their entireties.

BACKGROUND

Field

The disclosure relates to wireless communications and, for example, to associating an intelligent reflecting surface (IRS) to a network and a user equipment in a communication network (e.g. $5^{th}$ generation wireless network or $6^{th}$ generation wireless network.)

Description of Related Art

Users are increasingly imposing performance requirements in $5^{th}$ generation and $6^{th}$ generation wireless networks, such as ultra-high data rate, global coverage and connectivity, extremely high reliability and low latency, which may not be achieved by existing technologies for 5G. The radio propagation environment (which can be random and largely uncontrollable) can be dynamically reconfigured to enhance the performance of the wireless communication network by leveraging the digitally controlled passive meta-surface.

An intelligent reflecting surface (IRS) (or its various equivalents such as reconfigurable intelligent surface (RIS)) can be utilized to dynamically control the amplitudes and/or phases of its reflected signals using controller such as creating virtual line-of-sight (LoS) links, improving the channel rank conditions, enhancing desired signal power and the like.

Currently, the IRS can be deployed at the distributed side of the user to enhance the communication performance with the nearing base station and the user device. The deployment of IRS depends on the passive signal reflection by minimizing/reducing the severe distance path loss over the links between the associated base station and the user device, respectively. Therefore, deployment of the IRS based on the position of base station and the user device may not provide maximum performance required in 5G and 6G communication networks.

The existing mechanism can be used to identify the beams reflected from the IRS to the base station by calculating the angle of arrival and departure using the geographical positioning location of the user device. Thus, the communicating devices in the 5G and 6G networks are required to perform a discovery process for establishing a connection between the base station and the user device.

Therefore, the conventional deployment methods may result in poor connectivity of the devices to the base station, which may not meet the requirements needed for establishing connections in 5G and 6G wireless networks.

SUMMARY

Embodiments of the disclosure provide methods and systems for deploying and associating an intelligent reflecting surface (IRS) to a network and a user equipment in $5^{th}$ generation and $6^{th}$ generation wireless network.

Embodiments of the disclosure provide methods and systems for estimating the direction of transmission and reception of the beam formed reference signals by the base station.

Embodiments of the disclosure provide methods and systems for configuring the reference signal to the intelligent reflecting surface panel.

Embodiments of the disclosure provide methods and systems for enabling the intelligent reflecting elements based on time division in regular time interval.

Embodiments of the disclosure provide methods and systems for configuring the user equipment (UE) to the intelligent reflecting surface based on the associated reference signal.

Embodiments of the disclosure provide methods and systems for configuring a reflecting surface. According to an example embodiment, a method by a base station disclosed herein includes: receiving at least one discovery signal from the reflecting surface; estimating a direction of a panel of the reflecting surface for transmission and reception using at least one spatial information based on the received at least one discovery signal; identifying a set of beam formed reference signals transmitted in the direction of the panel of the reflecting surface; and configuring at least one reference signal to the reflecting surface based on the identified set of beam formed reference signals Embodiments of the disclosure provide methods and systems for configuring a reflecting surface element. According to an example embodiment, a method by a reflecting surface includes: broadcasting at least one discovery signal to enable one or more of a plurality of reflecting elements of the reflecting surface based on regular interval and duration; receiving, in response to the broadcasted at least one discovery signal, at least one multiple beam reference signal from a base station to enable at least one reflecting element of the plurality of reflecting elements; enabling the at least one reflecting element based on time division in regular interval and a duration provided by the base station, on receiving the at least one multiple beam reference signal from the base station; and identifying a direction of each of the at least one reflecting element based on the received at least one multiple beam reference signal Embodiments of the disclosure provide a base station comprising: a transceiver; and a controller coupled to the transceiver, wherein the controller is configured to: receive at least one discovery signal from the reflecting surface; estimate a direction of a panel of the reflecting surface for transmission and reception using at least one spatial information based on the received at least one discovery signal; identify a set of beam formed reference signals transmitted in the direction of the panel of the IRS; and configure at least one reference signal to the reflecting surface based on the identified set of beam formed reference signals.

Embodiments of the disclosure provide an intelligent reflecting surface (IRS) comprising: a transceiver; and a controller coupled to the transceiver, wherein the controller is configured to: broadcast at least one discovery signal to enable one or more of a plurality of reflecting elements of the reflecting surface based on regular interval and duration; receive, in response to the broadcasted at least one discovery signal, at least one multiple beam reference signal from a base station to enable at least one reflecting element of the plurality of reflecting elements; enable the at least one reflecting element based on time division in regular interval and a duration provided by the base station, on receiving the at least one multiple beam reference signal from the base station; and identify a direction of each of the at least one reflecting element based on the received at least one multiple beam reference signal.

These and other aspects of the various example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit of the disclosure, and the disclosure includes all such modifications.

BRIEF DESCRIPTION OF THE DRAWINGS

Embodiments herein are illustrated in the accompanying drawings, throughout which reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
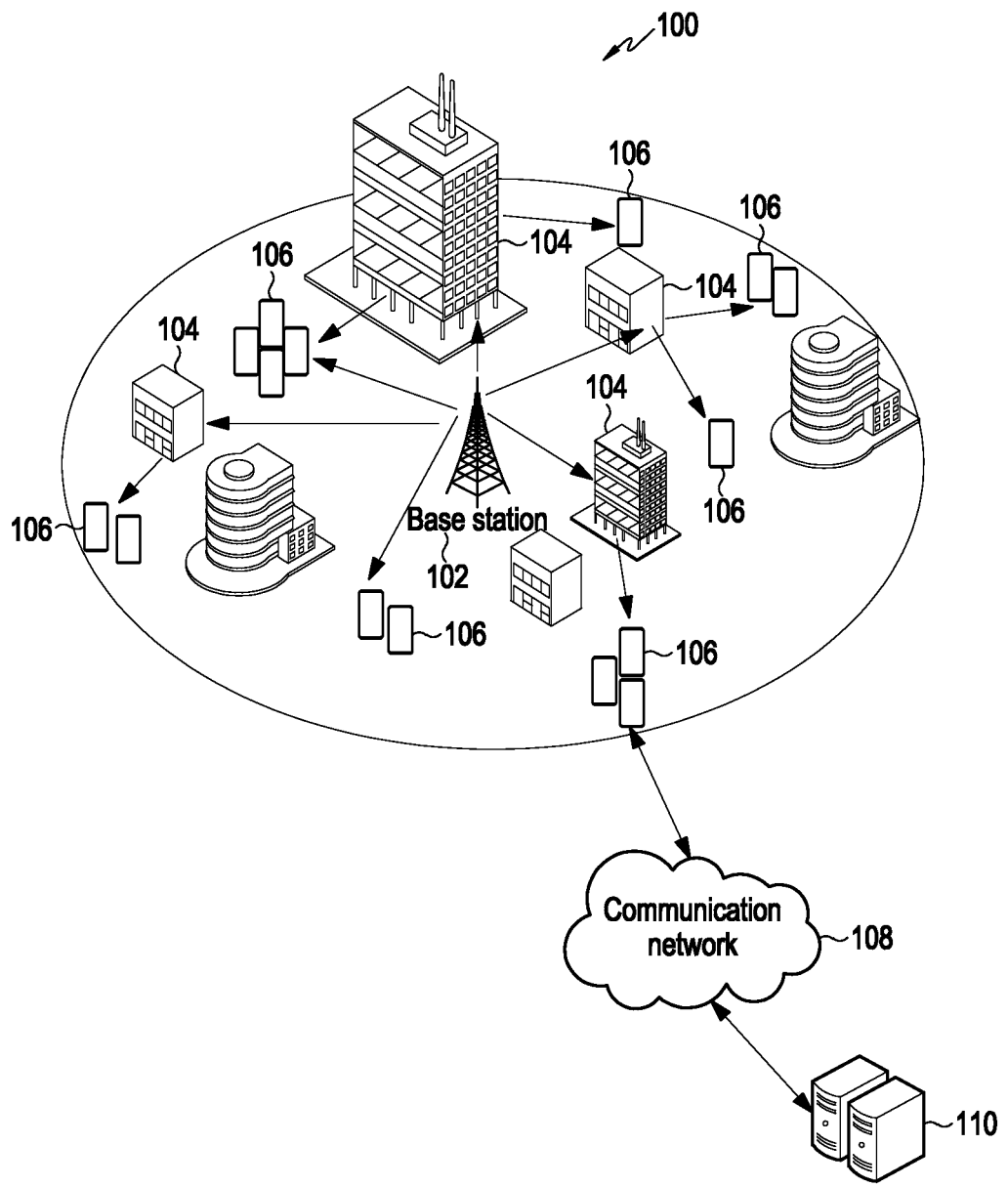
FIG. 1 is a diagram illustrating an example environment for associating an intelligent reflecting surface (IRS) to a network and a user equipment through a base station in wireless network, according to various embodiments.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for deploying and associating an intelligent reflecting surface (IRS) to a network and user equipment in wireless networks. Referring to the drawings, and more particularly to FIGS. 1 through 18, where similar reference characters denote corresponding features consistently throughout the figures, there are illustrated and described various example embodiments.

FIG. 1 is a diagram illustrating an example environment for associating an intelligent reflecting surface (IRS) to a network and a user equipment through a base station in wireless networks, according to various embodiments. As illustrated in FIG. 1, environment 100 includes a plurality of intelligent reflecting surface (IRS) 104 configured to the multiple existing buildings or other infrastructure, a base station 102 and a plurality of user equipment 106. The user equipment 106 may be connected to the communication network 108 connected to a server 110.

Wireless networks, as referred to herein can be a Fifth generation (5G) network or any beyond 5G network (such as, but not limited to, Sixth Generation (6G) networks, and so on). The communication network 108 may include at least one of, but is not limited to, a wired network, a value-added network, a wireless network, a satellite network, or a combination thereof. In another example, the plurality of user equipment 106, and the databases may be connected with each other directly and/or indirectly (for example, via direct communication, via an access point, and so on). In another example, the plurality of user equipment 106, and the databases may be connected with each other via a relay, a hub, and a gateway. It is understood that user equipment 106, and the databases may be connected to each other in any of various manners (including those described above) and may be connected to each other in two or more of various manners (including those described above) at the same time.

The base station 102 referred to herein may be a fixed station that uses radio waves to communicate with one or more connected devices such as a plurality of intelligent reflecting surface (IRS) 104 and to a plurality of user equipments 106. The base station 102 may serve as a supporting unit for communicating multiple devices, can provide a link between the plurality of (IRS) 104 and the plurality of user equipment (UE) 106. The wireless communications system may support reference signaling, which may enable a base station or the plurality of UE 106 to estimate channel conditions or signals for communications. The base station 102 may range in size and area of coverage. The base stations can transmit signals in all directions using the directional antennas aimed at a specific direction. The base stations may be owned by a single carrier, but may also offer roaming coverage for other networks.

The base stations 102 may be distributed through a geographical area to form a wireless communications network and may be a group of devices in different forms or having different capabilities. Base stations 102 and a plurality of user equipments 106 may communicate with each other and other entities. The coverage area may be an example of a geographical area over which a base station 102 and a plurality of user equipment 106 may support communication of signals based on radio access technologies.

The base stations 102 may communicate with the core network or communication network 108, or with one another, or both. For example, the base stations 102 may interface with the core network through one or more links. One or more of the base stations 102 referred herein may include or may be referred to by a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

The plurality of user equipments (UEs) 106 referred to herein may be a device capable of communicating with other devices (the base station and the intelligent reflecting surface (IRS)). The plurality of UEs 106 may be associated with the base station 102 based on the location and area of coverage. The UEs may be capable of communicating with the server 110 using the communication network 108.

Examples of the plurality of user equipment 106 may be, but are not limited to, a smart phone, a mobile phone, a video phone, a computer, a tablet personal computer (PC), a net book computer, a laptop, a wearable device, a vehicle infotainment system, a workstation, a server, a personal digital assistant (PDA), a smart plug, a portable multimedia player (PMP), a home appliance, one or more sensors, or any other device capable of communicating with the base station 102.

The intelligent reflecting surface (IRS) 104 referred herein may be a device capable of manipulating the propagation of electromagnetic waves such as signals, reference signals and the like in a programmable manner using the reflecting elements of the IRS in a controllable manner. The wireless networks may support communications between devices using the intelligent reflecting surface (IRS) 104.

The IRS 104 may adjust one or more reflecting elements of the surface to improve communications reliability and system performance. In an embodiment, the reflecting elements of the IRS can be configured using passive elements e.g., elements that do not use power to reflect the signals, such as reflective materials (e.g., metal materials, chemical materials, etc.), or the IRS device may use one or more active elements to redirect signals.

As depicted in FIG. 1, the base station 102 can be configured to the plurality of installed IRSs. The base station 102 can be configured to receive discovery signals transmitted by the IRS 104. Thus, active links from the base station can be enabled to connect multiple IRS and the UEs. The passive links from the IRS 104 can be enabled to communicate with the base station, which can respond to the transmitted discovery signals.

The base station 102 can be configured to receive a discovery signal transmitted by the IRS 104. The discovery signal may be a signal that can facilitate efficient neighbor discovery of the communicating devices in the network. The base station 102 on receiving the discovery signal can be configured to determine the direction of the transmission and reception with respect to the IRS 104. The discovery signal, transmitted by the IRS, can be identified by the base station using a pre-defined radio, comprising a standard set of radio beams with a pre-defined frequency to transmit and receive signals.

The discovery signal transmitted by the IRS may include but not limited to location information with geographical positioning system (GPS) co-ordinates, height and orientation of the IRS panel, number of reflecting elements, number of reflecting elements combined with the signal that can be broadcasted to all the nearby base station, number of reflecting directions on the IRS to reflect the base station. The base station 102 can be configured to select the beams for communicating with the IRS 104, which can be performed by transmitting and receiving beams with the IRS 104. Therefore, base station 102 can establish a connection with IRS 104 through the communication.

Figure 2:
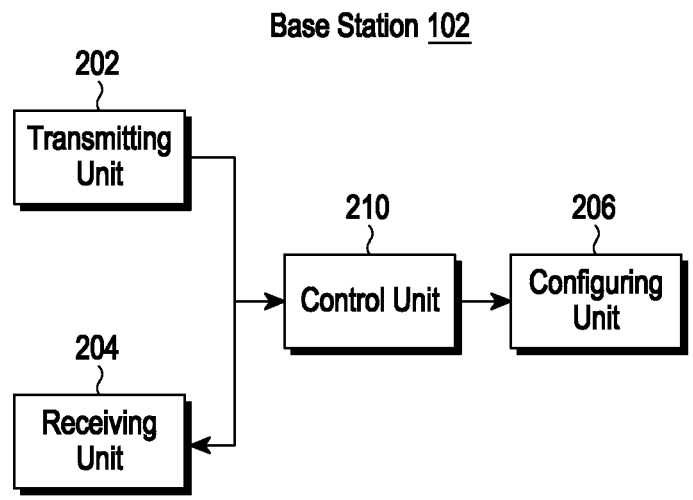
FIG. 2 is a block diagram illustrating an example configuration of the base station, according to various embodiments.

FIG. 2 is a block diagram illustrating an example configuration of the base station, according to various embodiments. The base station 102 includes a transmitting unit (e.g., including transmitting circuitry) 202, a receiving unit (e.g., including receiving circuitry) 204, a configuring unit (e.g., including various circuitry and/or executable program instructions) 206, and a control unit (e.g., including control circuitry) 210.

The receiving unit 204 may include various circuitry and be configured to receive signals which may include but not limited to discovery signal(s), broadcast signal(s), reference signal(s), transmission signal(s), beams, pilot signal(s) and the like. The receiving unit 204 may be configured to receive a discovery or broadcast signal transmitted by the IRS. The discovery signal may include active information to be broadcasted to the nearby base station 102. The discovery signal transmitted by the IRS may include, but not be limited to, location information with geographical positioning system (GPS) co-ordinates, height and orientation of the IRS panel, number of reflecting elements, number of reflecting elements combined with the signal that can be broadcasted to all the nearby base station, number of reflecting directions on the IRS to reflect to the base station, and so on.

The discovery signal transmitted by the IRS can be identified by the nearby base station 102 using a pre-defined radio. The pre-defined radio comprises a standard set of radio beams with a pre-defined frequency to transmit and receive signals to the communicating devices. The term 'discovery signal' as referred to herein may be interchangeably used with broadcast signal, transmitting signal, existence signal, beams and the like.

The transmitting unit 202 may include various circuitry and can be configured to transmit signals to devices such as the IRS 104 and the UE 106. The transmitting unit 202 can enable the base station to communicate with multiple devices using a plurality of signals which may include but not limited to reference signal, transmission signal, and the like. The transmitting unit 202 and the receiving unit 204 may be integrally referred to as a transceiver.

The control unit 210 of the base station can be configured to control the operations performed by the BS. The control unit 210 can be enabled to control transmission and reception of signals. On the base station 102 receiving the discovery signal from the IRS 104, the control unit 210 can be configured to determine the direction of transmission and reception of the signals with respect to beam formed reference signals. The direction of transmission and reception of the signals can be determined based on the spatial information transmitted by the IRS panel. The control unit 210 can be configured to estimate the direction of transmission and reception of the IRS panel using spatial information. Spatial information may include but not limited to location, co-ordinates and the orientation of the base station corresponding to the IRS, and so on.

The beam formed reference signals may include Synchronization Signal Block (SSB) or Channel State Information (CSI) reference signals. CSI reference signals are used in downlink direction in the 5G network for the purpose of channel sounding and measure the characteristics of radio channel so that it can use correct modulation, code rate, beam forming and the like. SSB contains primary and secondary synchronization signals (PSS and SSS respectively) and the physical broadcast channel (PBCH). PSS and SSS in 5G represents physical cell identity (PCI) and (PBCH) carries the master information block plus a few additional payload bits for transmitting signals.

The reference signals can be used to estimate the channel conditions for communicating between the base station 102 and the IRS 104. For example, devices in the wireless communications may establish communication using the reference signals, which may result in efficient communications and enhanced channel estimation (for example, estimation of the paths between the base station and the UE through the reference signals by the IRS device, or a combination thereof).

The control unit 210 of the base station 102 can be configured to select the transmission and reception beams for communicating with the IRS 104. The base station on receiving the discovery signal can estimate the direction of the received signal from the IRS using the broadcast information. The control unit 210 can identify the set of reference signals received in the IRS direction.

The configuring unit 206 of the base station 102 may include various circuitry and/or executable program instructions and can be configured to establish a connection with the devices such as the IRS 104 and the UE 106. The control unit 210, on determining the direction of the received reference signal from the IRS 104, can determine the set of reference signals for communicating with the IRS. The configuring unit 206 can establish communication with the IRS.

The control unit 210 can be configured to identify the direction of IRS panel and the associated beam formed reference signals using the location of the IRS, size and orientation of the IRS panel. The control unit 210 can be configured to request the IRS to reflect the signals in all directions using a pre-defined time division manner for a specific period. The control unit 210 can be configured to enable the transmitting unit 202 to transmit beam formed reference signals in a time-division manner. The control unit 210 can identify the direction using the received reflected signal strength.

The control unit 210 and the configuring unit 206 may be integrally referred to as a controller or at least one processor.

Figure 3:
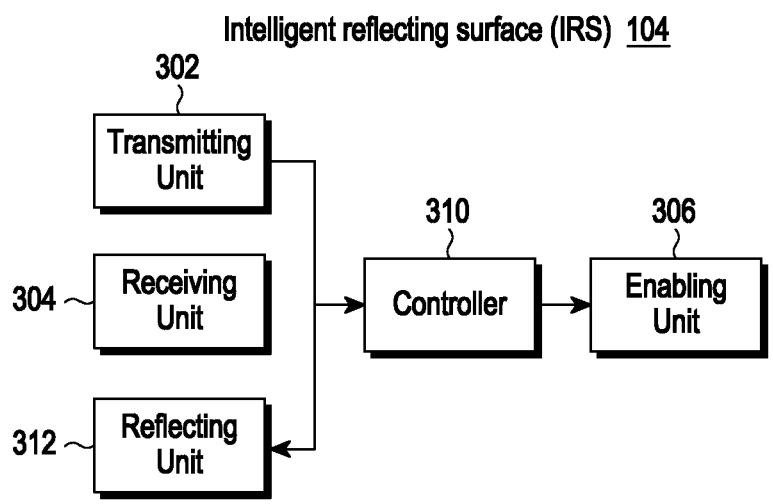
FIG. 3 is a block diagram illustrating an example configuration of the intelligent reflecting surface (IRS), according to various embodiments.

FIG. 3 is a block diagram illustrating an example configuration of the intelligent reflecting surface (IRS), according to various embodiments. The intelligent reflecting surface (IRS) 104 comprises a transmitting unit (e.g., including transmitting circuitry) 302, a receiving unit (e.g., including receiving circuitry) 304, a reflecting unit (e.g., including reflecting circuitry) 312, a controller (e.g., including processing circuitry) 310, an enabling unit (e.g., including various circuitry and/or executable program instructions) 306 and a communicating unit (e.g., including communication circuitry) 308.

The transmitting unit 302 may include various transmitting circuitry and can be configured to transmit signals such as discovery signals, broadcast signals, reference signals, communicating signals and the like. On configuring IRS on any multiple infrastructure or buildings, the controller 310 can enable the transmitting unit 302 to transmit or broadcast discovery signal to the nearby base stations using pre-defined radio. The transmitting unit 302 and the receiving unit 304 may be integrally referred to as a transceiver.

The discovery signal transmitted by the IRS may include but not limited to location information with geographical positioning system (GPS) co-ordinates, height and orientation of the IRS panel, number of reflecting elements, number of reflecting elements combined with the signal that can be broadcasted to all the nearby base station, number of reflecting directions on the IRS to reflect the base station.

The discovery signal, transmitted by the IRS, can be identified by the nearby base station 102 using a pre-defined radio. The pre-defined radio comprises a standard set of radio beams with a pre-defined frequency to transmit and receive signals to the communicating devices.

The controller 310 of the IRS may include various processing circuitry and can be configured to control one or more operations performed by the IRS. The IRS can be installed on any infrastructure and the controller 310 can be enabled to broadcast the discovery signal to identify one or more nearby base stations 102. The base station 102, on identifying the broadcast discovery signal using the pre-defined radio, can estimate the direction of transmission and reception to the IRS panel using the spatial information transmitted by the IRS. The spatial information may include, but not limited to, location, ordinates and the orientation of the base station corresponding to the IRS.

The base station 102, on estimating the direction, can identify the set of beams for transmitting to the IRS panel and to be received from the IRS panel. In an embodiment herein, the beams associated with the IRS panel can be Synchronization Signal Block (SSB) or Channel State Information (CSI) reference signals. CSI reference signals are used in downlink direction in 5G networks for the purpose of channel sounding and used to measure the characteristics of radio channel so that it can use correct modulation, code rate, beam forming and the like. SSB contains primary and secondary synchronization signals (PSS and SSS) and the physical broadcast channel (PBCH). PSS and SSS in 5G represents physical cell identity (PCI) and (PBCH) carries the master information block and one or more additional payload bits for transmitting signals.

The receiving unit 304 of the IRS may include various receiving circuitry and can be configured by the controller 310 to receive signals from the communicating devices. Based on the received signals by the receiving unit 304, the controller 310 can be configured to perform one or more operations. The enabling unit 306 can be configured by the controller 310 to enable the reflecting elements of the IRS panel to reflect the transmitted signals to the IRS.

In an embodiment, the transmitting unit 302 can be configured by the IRS controller 310 to broadcast the availability of the existing IRS panels with the total number of possible reflecting elements in the signal to the nearby base stations using the pre-defined radio.

The base station 102, on identifying the broadcast or discovery signal using the pre-defined radio, can notify the receiving unit 304 of the IRS using the same pre-defined radio. The IRS, on receiving the enable notification from the base station, can enable the set of possible reflecting elements on the IRS.

The enabling unit 306 of the IRS may include various circuitry and/or executable program instructions and can be configured to enable a set of reflecting elements on the IRS with the corresponding reflecting directions based on a time division manner with a defined periodicity and time interval. The enabling unit 306 can enable the set of reflecting elements one by one in a time division manner in at specified time intervals. The base station can select the set of reflecting elements to be used and the base station can provide information regarding the time interval and duration for which the reflecting elements have to be enabled for a specific periodicity. The periodicity depends on a number of at least one multiple beam reference signals, number of transmitted beams in reflecting directions and maximum number of transmissions required to identify the direction of the IRS panel.

The base station 102 can transmit multiple beam formed reference signals in the direction of the IRS controller 310 multiple times to identify the direction of IRS and to determine the associated one or a set of reference signals. Examples of the beam formed reference signals may include but not limited to SSB, CSI, or any new reference signals.

CSI reference signals are used in downlink direction in 5G networks for the purpose of channel sounding and used to measure the characteristics of radio channel so that it can use correct modulation, code rate, beam forming and the like. SSB contains primary and secondary synchronization signals (PSS and SSS) and the physical broadcast channel (PBCH).

The reflecting unit 312 of the IRS can be configured by the controller 310 to reflect the signals to the base station. The reflecting unit 312 can be configured to reflect multiple beam formed reference signals transmitted by the base station in different directions one after the other in time division manner.

The base station 102 can receive the reflected signals from the reflecting unit 312 of the IRS in the transmitted directions for a pre-defined time duration specified by the base station. Thus, before expiration of the timer, the direction of one or multiple set of reference beams in which the base station has received the beams with the maximum signal strength can be identified as the set of beams associated with the IRS panel. Hence, the process of analyzing the received signal strength associated with the direction of reflecting elements in the IRS panel can be repeated multiple times to confirm the direction of reflection respectively in a time division manner.

Time division manner referred herein may refer, for example, to a method for transmitting and receiving reference signals over a common signal path by means of synchronized switches at each end of the line so that each signal appears as an individual one. This can transmit two or more signals over a common channel. The term time division manner referred herein may be interchangeable with and used as "time division multiplexes", "multiplexing in time domain", "time domain multiplexing", "multiplexing in time division" and the like.

In an embodiment herein, the IRS 104 can broadcast the discovery signal with the active information for a number of reflecting directions referred as "R". The base station 102, on receiving the broadcast signal, can indicate to the IRS to enable one or more sets of reflecting elements with a given time interval and specify the time duration for reflecting the signals. The base station 102 can transmit the multiple reference signals with "R" repetitions of each reference signal in the specific direction of the IRS panel.

The IRS panel can reflect the signals in one or more directions in a time division manner. The base station 102 can capture the reflected signals from the IRS 104 to identify the signals with the maximum strength. The signals with the maximum strength are referred to herein as "M" beams. The base station 102 can associate the identified reference signal(s) with the corresponding identification number(s) with a reference signal resource set.

For an example, consider that "T" is the total number of reference signals to be transmitted, and these reference signals can be multiplexed in time division manner. As the IRS has a total number of "R" reflecting directions, each reference signal has to be transmitted "R" times. Thus, the repetition of the same reference signals shall be multiplexed in time domain. Hence, the total transmission of all the reference signals can be repeated for a maximum of "N" number of times to identify the direction of the IRS panel. Therefore, the periodicity shared by the base station to the IRS panel can be determined by the base station based on the parameters T, N and R.

Figure 4:
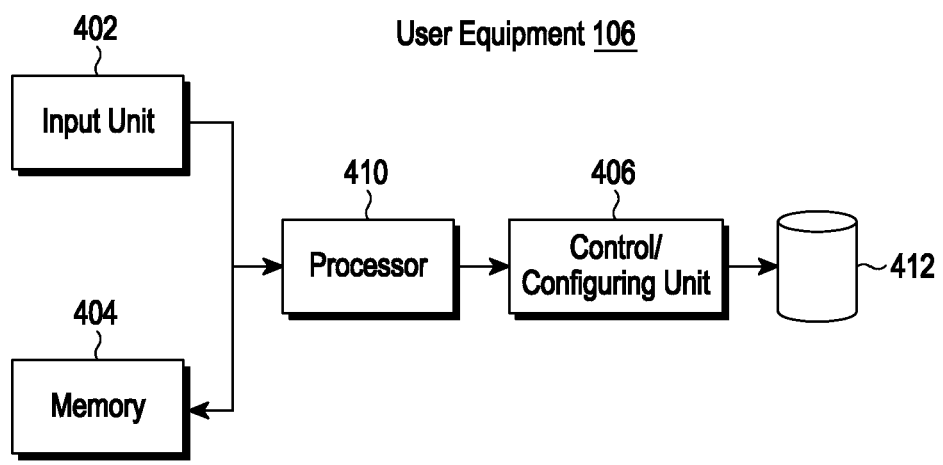
FIG. 4 is a block diagram illustrating an example configuration of the user equipment (UE), according to various embodiments.

FIG. 4 is a block diagram illustrating an example configuration of the user equipment (UE), according to various embodiments. The user equipment 106 includes an input unit (e.g., including input circuitry) 402, a memory 404, configuring unit (e.g., including various processing circuitry and/or executable program instructions) 406, a processor (e.g., including processing circuitry) 410 and a database 412.

The memory 404 referred herein include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The memory 402 may store at least one of, but is not limited to, configuration information related to base station, the reference signals associated with IRS panel, strength of the reference signals, report details of the reference signals and the like.

The input unit 402 may include various input circuitry and be configured to receive signals from the communicating devices that may include at least one of, but is not limited to, base stations; IRS, user devices and the like. The user equipment 106 can be configured with the corresponding IRS based on measured reference signals. The user equipment can be associated to the base station by measuring the multiple beam reference signals using the configuring unit 406.

In an embodiment, the association between the user equipment 106 and the IRS can be performed using the configuring components such as CSI, SSB or any new reference signals shared by the base station. The configuring components may also include, but not limited to measuring components and the reporting components.

The configuring unit 406 of the user equipment 106 may include various circuitry and/or executable program instructions and be configured to associate the user equipment 106 to the corresponding base station using the reference signals. The base station 102 can configure the user equipment 106 using the configuring unit 406 for measuring the set of pilots or reference signals associated with each of the IRS through the component CSI-measconfig. The term "reference signals" referred herein may be interchangeably used with beams, signals, pilot beams, pilot signals, transmitting beams, transmitting signals, and the like.

The configuring unit 406 may be configured to include the CSI-measconfig component, which can be used to measure the beam mobility, signal strength and the channel state information of the reference signals or the pilot signals. The UE can send the measurement report to the base station for associating the UE to the IRS. The component CSI-reportconfig component can be used to send a report of the measured parameters to the network or to any connecting devices.

On measuring the beam mobility, beam strength and channel state information of the reference signals, the CSI-reportconfig component on the UE can be configured to send the measured report to the base station. The base station 102, on receiving the measured report, matches the pre-defined reporting criteria. The base station 102 can provide one or more pre-defined reporting criteria with one or more standard set of values for the beam mobility, beam strength and channel state information.

The base station, on identifying the measured report matching the pre-defined reporting criteria, indicates to the UE to associate with the IRS. Therefore, the user equipment can be associated with the IRS by CSI, SSB and new reference signals sent by the base station 102 using the configuring components CSI-measconfig and CSI-reportconfig.

The processor 410 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The processor 410 may be configured to measure the beam mobility, strength of the reference signals and the channel state information of the received reference signals. On measuring the parameters of the reference signals, the user equipment 106 can be configured by the processor 410 to send the measured report of the reference signals to the base station. The base station 102 on identifying the measured report matching the pre-defined reporting criteria with the standard set of values for the beam mobility, beam strength and channel state information. Therefore, the base station 102, on identifying the measured report matching the pre-defined reporting criteria, indicates to the user equipment to associate with the IRS.

In an embodiment, a plurality of IRS panels can be installed on multiple buildings or any infrastructure that can be identified using a pre-defined identification number by the base station. The base station can be configured to associate each IRS with one or set of reference signals such as SSB, CSI or a set of new reference signals such as positioning or directional reference signals. The base station 102 can associate multiple IRSs 104 based on the position and direction of the reference signals transmitted by the IRSs.

In an example, the IRS 104 can be associated with a set of CSI reference signal as follows:
IRS$_1$—{CSIRS$_i$, CSIR$_{i+1}$, ... }
IRS$_2$—{CSIRS$_j$, CSIR$_{j+1}$, ... }
IRS$_N$—{CSIR$_k$, CSIR$_{k+1}$, ... }

The base station 102 can be configured to request the IRS controller 310 to enable one or more sets of reflecting elements of the IRS panel one by one based on time division manner for a given time period. The base station 102 can communicate with the IRS using the pre-defined radio. The time period for transmitting reference signals can be decided by the base station based on the number of IRS panels, and the number of reflecting directions shared by the IRS controller 310 in the discovery signals. The user equipment 106 can be configured by the base station 102 for measuring the set of reference signals or pilot signals associated with each of the IRS through CSI-measconfig. The base station can configure the UE for RSRP and SINR report for the sets of pilots or reference signals associated with the IRS through CSI-reportconfig. Reference Signal Received Power (RSRP) referred herein may relate to the average power or strength of the received signals (reference signal) or the level of the received signal from the base station. SINR referred herein may relate to a combination of signal interference and the noise ratio, in which the noise ratio is the ratio of the level to the noise level. The higher the value of SINR, better the signal quality.

In another example, the user equipment 106, and the database 412 may be connected with each other directly (for example: via direct communication, via an access point, and so on). In another example, the user equipment 106, and the database 412 may be connected with each other via a relay, a hub, and a gateway. It is understood that the user equipment 106, and the database 412 may be connected to each other in any of various manners (including those described above) and may be connected to each other in two or more of various manners (including those described above) at the same time.

The configuring unit 406 may include one or more components, which enable the user equipment 106 to communicate with another device (for example, the base station, the IRS (not shown)) using the communication methods that have been supported by the communication network. The communication interface may include the components such as a wired communicator, a short-range communicator, a mobile/wireless communicator, and a broadcasting receiver.

The wired communicator may enable the user equipment 106 to communicate with the devices using the communication methods such as, but are not limited to, wired LAN, Ethernet, and so on. The short-range communicator may enable the user equipment 106 to communicate with the other devices using the communication methods such as, but are not limited to, Bluetooth low energy (BLE), near field communicator (NFC), WLAN (or Wi-fi), Zigbee, infrared data association (IrDA), Wi-Fi Direct (WFD), UWB communication, Ant+ (interoperable wireless transfer capability) communication, shared wireless access protocol (SWAP), wireless broadband internet (Wibro), wireless gigabit alliance (WiGiG), and so on. The mobile communicator may transmit/receive wireless signals with at least one of a base station, an external terminal, or a server on a mobile communication network/cellular network. For example, the wireless signal may include a speech call signal, a video telephone call signal, or various types of data, according to transmitting/receiving of text/multimedia messages. The broadcasting receiver may receive a broadcasting signal and/or broadcasting-related information from the outside through broadcasting channels. The broadcasting channels may include satellite channels and ground wave channels. In an embodiment, the user equipment 106 may or may not include the broadcasting receiver.

Figure 5:
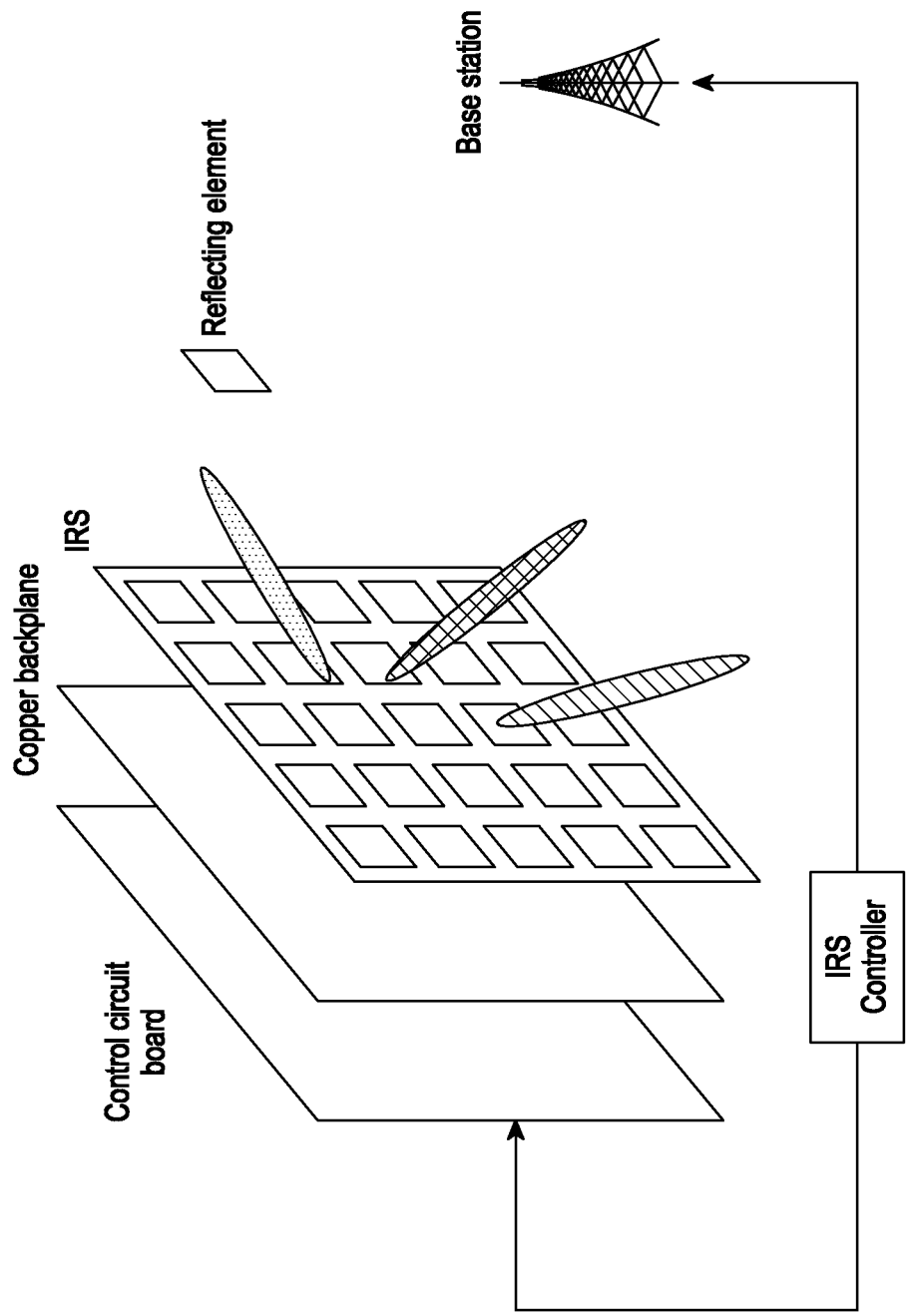
FIG. 5 is a diagram illustrating an example implementation of the IRS using the base station, according to various embodiments.

FIG. 5 is a diagram illustrating an example implementation of the IRS using the base station, according to various embodiments a. As depicted in the example, the intelligent reflecting surface (IRS) or reconfigurable intelligent surface (RIS) is a digitally controlled meta-surface with low cost passive reflecting elements. The IRS is an example of a surface capable of manipulating the propagation of electromagnetic waves (e.g., signals) in a programmable manner such that reflecting elements of the IRS can be controllable. The reflecting elements of the IRS can be configured with the passive elements, which do not use power elements to reflect signals. The IRS does not contain any component or element for transmitting radio frequency (RF) and thus consume less power.

As depicted, the IRS controller can be configured to control the reflection coefficients of each IRS element. Thus, the IRS can communicate with other nodes/communicating devices on the network. Further, the IRS controller can adjust the reflecting coefficients of the reflecting elements dynamically, as required.

The IRS controller can be configured to adjust the properties of the reflecting elements to different angles for the beam direction of signals. For instance, the IRS may determine the reflection coefficients in which the base station may indicate desired reflection coefficients for the reflection elements based on estimated channel conditions. The IRS may apply a change to a reflection element in accordance with a respective reflection coefficient (e.g., a reflection coefficient value may indicate to increase or decrease a reflection angle for the beam and the IRS may adjust a property of the reflection element to obtain the reflection angle). Accordingly, the base station 102 may configure the IRS to adjust a transmission angle between the base station 102 and the UE 106. Therefore, resulting in improved signal reliability and system performance, with low power consumption.

Figure 6:
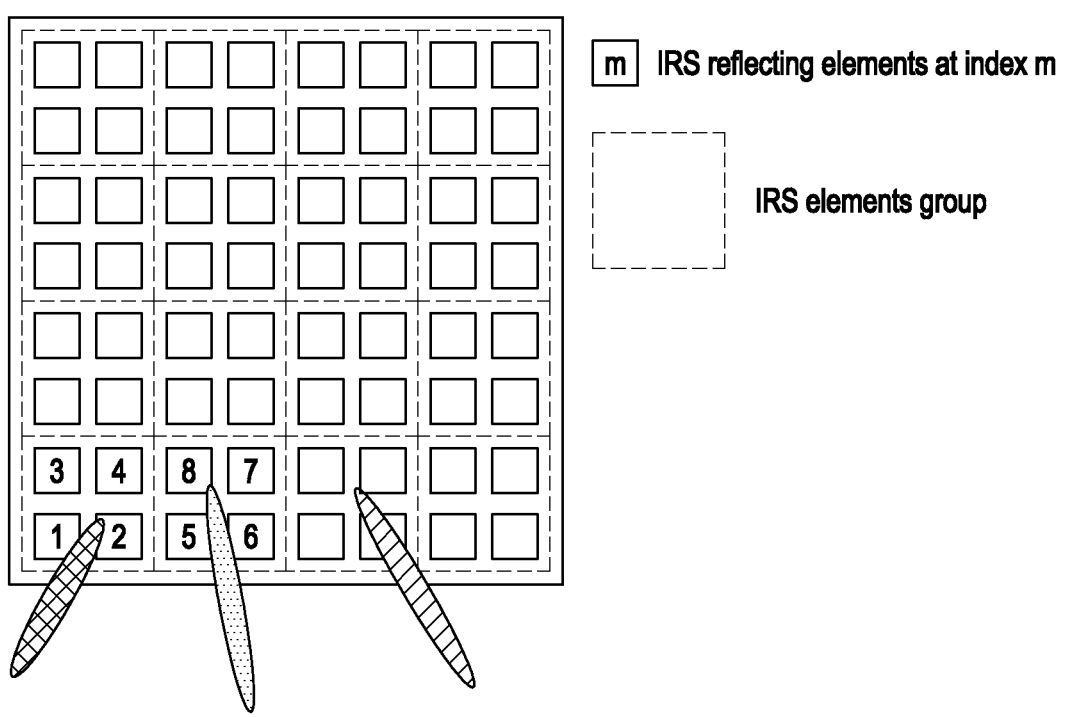
FIG. 6 is a diagram illustrating example grouping of IRS elements to reflect signals in a particular direction, according to various embodiments.

FIG. 6 is a diagram illustrating example grouping of IRS elements to reflect signals in a particular direction, according to various embodiments. As depicted, in the example, the IRS panel can be configured with a plurality of reflecting elements in which the activation, amplitude and phase control of the elements in the group can be controlled by the IRS controller. Also, the IRS can reflect the beams or signals in different directions based on the enabled set of elements.

As depicted in the example, for the IRS panel, the IRS controller can identify the group of IRS elements denoted by "N" number of possible groupings along with the amplitude and phase control of the elements in the group that can be used to reflect the signals in N possible directions. From the depicted example, the elements of the IRS with the numbers 1, 2, 3 and 4 represent a group that reflects the beams in a first direction. In the same manner, the elements numbered 5, 6, 7 and 8 forms another group which reflects the beams in a second direction.

For an example, the IRS panel can be configured to have a panel structure with 64 reflecting elements, which are divided into 16 groups of four reflecting elements each with each group can reflect the received signals or beams in particular direction. As depicted in the example diagram, each dotted box contains IRS reflecting elements which forms a group for reflecting beams in a specific direction.

Therefore, based on the communication received from the base station, the IRS controller can be configured to enable or configure a group of reflecting elements on the IRS panel to obtain reflection in the desired direction.

Figure 7A:
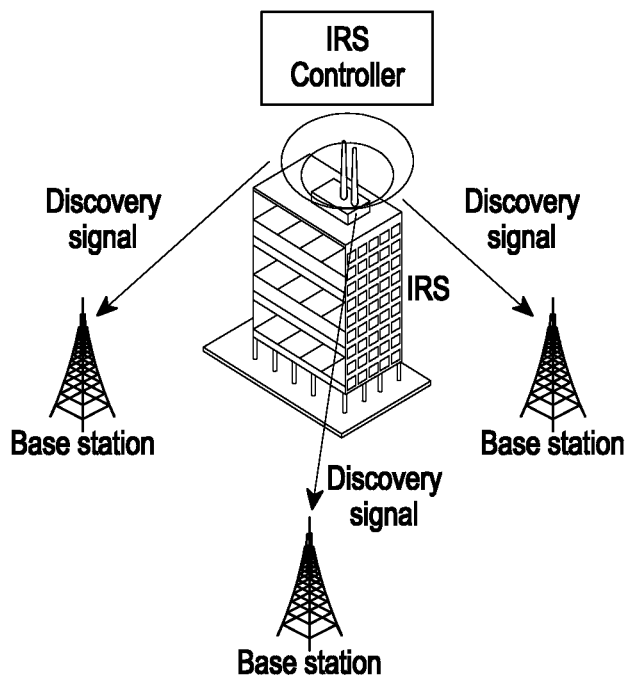
FIGS. 7A and 7B are diagrams illustrating an example of the IRS broadcasting a discovery signal to the base station and the base station identifying the set of beams formed reference signals in the direction of IRS respectively, according to various embodiments.
Figure 7B:
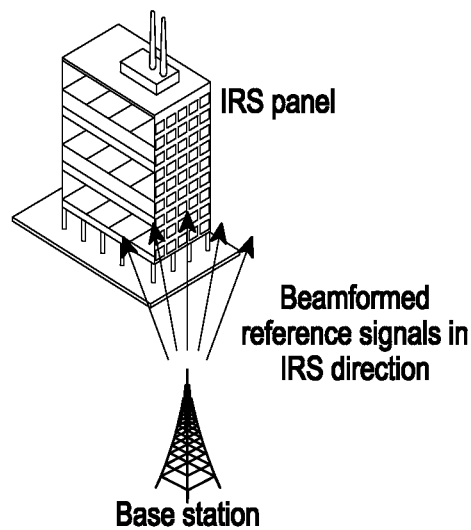

FIGS. 7A and 7B are diagrams illustrating an example of the IRS broadcasting discovery signal to the base station and the base station identifying the set of beams formed reference signals in the direction of IRS respectively, according to various embodiments. As depicted in the example diagram 7A, on configuring IRS on any buildings or infrastructure with the controller enabled, the controller can be configured to broadcast a discovery signal with the geo-positioning system (GPS) co-ordinates, height, and orientation of the IRS panel, number of reflecting elements, number of reflecting elements combined with the signal that can be broadcasted to all the nearby base station, number of reflecting directions on the IRS to reflect the base station.

The discovery signal transmitted by the IRS can be identified by the nearby base station 102 using a pre-defined radio. The pre-defined radio comprises a standard set of radio beams with a pre-defined frequency to transmit and receive signals to the communicating devices.

As depicted in FIG. 7B, the base station 102, on identifying the broadcast signal from the IRS using the pre-defined radio, can estimate the direction of transmission and reception to the IRS panel using the spatial information transmitted by the IRS controller. The spatial information may include, but not limited to, location, ordinates and the orientation of the base station corresponding to the IRS.

As depicted in FIG. 7B, the base station 102 can identify the set of beam formed reference signals in the direction of the IRS. The base station can transmit multiple beam formed reference signals in the direction of the IRS controller for multiple times to the IRS to identify the direction of IRS and to determine the associated one or a set of reference signals. The beam formed reference signals may include, but not limited to, SSB, CSI, or any new reference signals.

The base station, on estimating the direction of the signal, can identify the set of beams for transmitting to the IRS panel and the receiving from the IRS panel. The beams associated with the IRS panel can be SSB or CSI reference signals. CSI reference signals are used in downlink direction in the 5G network for the purpose of channel sounding and can be used to measure the characteristics of the radio channel, so that it can use correct modulation, code rate, beam forming and the like. SSB contains primary and secondary synchronization signals (PSS and SSS) and the physical broadcast channel (PBCH). PSS and SSS in 5G represents physical cell identity (PCI) and (PBCH) carries the master information block plus a few additional payload bits for transmitting signals.

Figure 8:
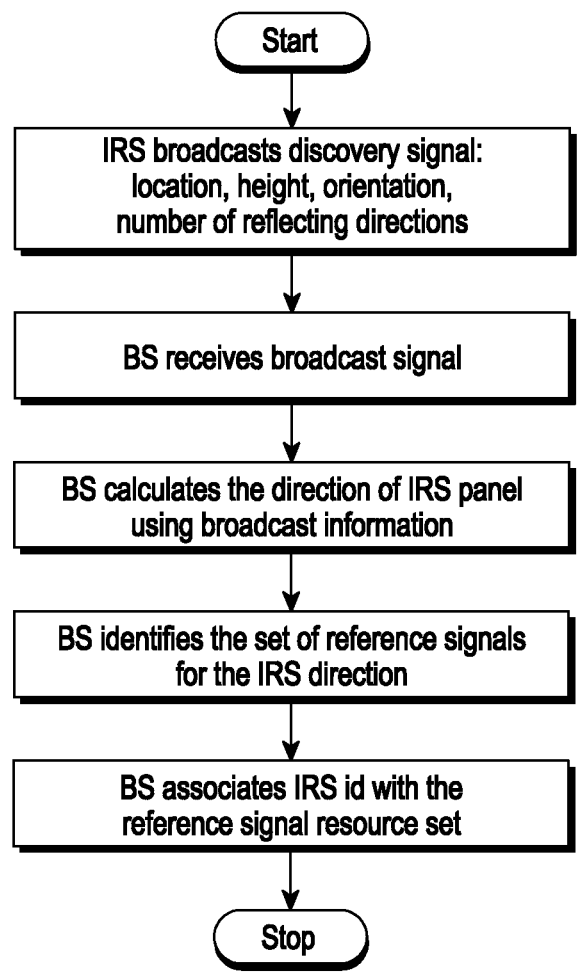
FIG. 8 is a flowchart illustrating association of the intelligent reflecting surface (IRS) and establishing a connection with base station in a network, according to various embodiments.

FIG. 8 is a flowchart illustrating example association of the intelligent reflecting surface (IRS) and establishing a connection with base station in a network, according to various embodiments.

As illustrated in the flowchart, the IRS can broadcast a discovery signal to one or more nearby base stations. The discovery signal may comprise location information with geographical positioning system (GPS) co-ordinates, height and orientation of the IRS panel, number of reflecting elements, number of reflecting elements combined with the signal that can be broadcasted to all the nearby base station, number of reflecting directions on the IRS to reflect the base station.

The base station can be configured to receive the broadcast signals and identify the direction of IRS panel based on the broadcast signal comprising other information. The base station can estimate the direction of transmission and reception of beams from the IRS. The base station, on identifying the set of reference signals from the discovery signal, can associate the corresponding IRS elements to the set of reference signals resource. Each of the IRS elements may be grouped and assigned with a corresponding IRS identification number. The IRS elements can be grouped, and each group can be configured to reflect beams or signals in a particular direction.

Figure 9A:
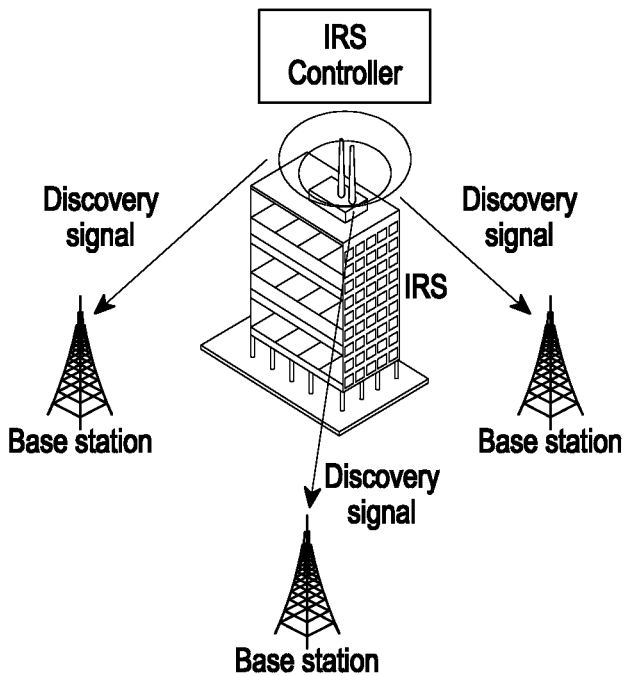
FIGS. 9A and 9B are diagrams illustrating an example of the IRS broadcasting the discovery signal to the base station and the base station transmitting a beam formed reference signals to identify direction of the IRS respectively, according to embodiments as disclosed herein.
Figure 9B:
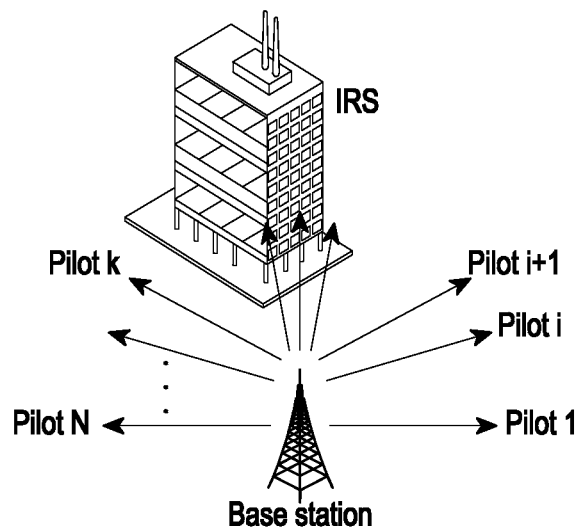

FIGS. 9A and 9B are diagrams illustrating examples of the IRS broadcasting the discovery signal to the base station and the base station transmitting a beam formed reference signals to identify direction of the IRS respectively, according to various embodiments.

In an embodiment herein, as depicted in FIG. 9A, on installing IRS on any buildings or infrastructure, the IRS controller can be turned on. The IRS controller can broadcast the discovery signal to notify the existence of IRS panel with the total number of possible reflecting elements to one or more nearby base stations. The base station, on identifying the broadcast discovery signal using the pre-defined radio, can estimate the direction of transmission and reception to the IRS panel using the spatial information transmitted by the IRS. The spatial information may include, but not limited to, location, ordinates and the orientation of the base station corresponding to the IRS.

As depicted in FIG. 9B, the base station, on identifying the broadcast information using the pre-defined radio, can respond to the IRS controller by transmitting the beam formed reference signals to identify the directions of the IRS. The base station may be configured to transmit the reference signals using the same radio to enable the set of IRS reflecting elements corresponding to each direction.

Thus, the IRS controller can be configured to enable the IRS reflecting elements to reflect in a particular direction one by one in a time division manner with a given periodicity and a time interval, as notified by the base station 102. The periodicity depends on a number of at least one multiple beam reference signals, the number of transmitted beams in reflecting directions, and the maximum number of transmissions to identify the direction of the IRS panel.

As depicted in FIG. 9B, the base station 102 can transmit multiple beam reference signals comprising SSB, CSI-RS, new reference signals and the like. The base station can transmit multiple beam formed reference signals in the direction of the IRS controller for multiple times to identify the direction of IRS panel and to determine the associated one or a set of reference signals. The beam formed reference signals may include, but not limited to SSB, CSI, or any new reference signals.

Figure 10:
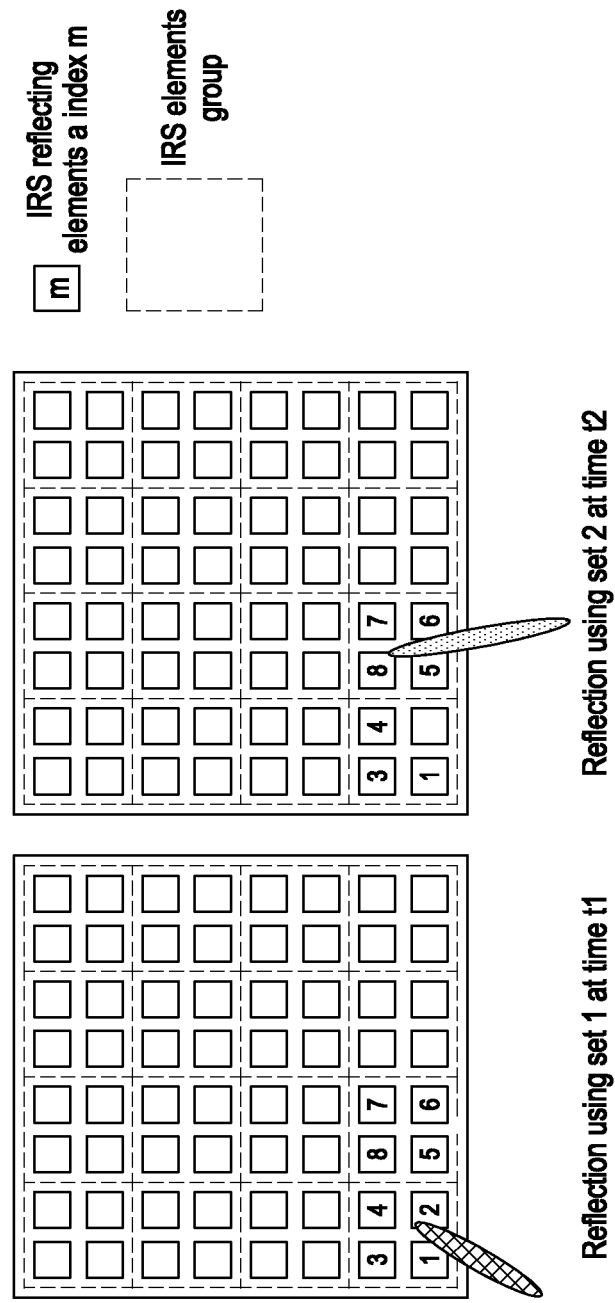
FIG. 10 is a diagram illustrating an example representation of IRS grouping elements and their reflection direction respectively in time division manner, according to various embodiments.

FIG. 10 is a diagram illustrating an example representation of IRS grouping elements and their reflection direction respectively in time division manner, according to various embodiments. As depicted in the example, the IRS panel can be configured to reflect signals as received in different directions one after the other in a time division manner.

The base station can receive the reflected signal in the direction as transmitted for a given period of time. Thus, before the expiration of the timer, the direction of the one or multiple set of reference beams in which the base station has received the beams with the maximum signal strength can be identified as the set of beams associated with the IRS panel.

Therefore, the process of analyzing the received signal strength associated to the direction of reflecting elements in the IRS panel can be repeated multiple times to confirm the direction of reflection respectively in time division manner.

The process of receiving the reflected signals and analyzing the maximum signal strength can be repeated, for "N" pre-defined number of times to confirm the direction of beams associated with the IRS panel. Hence, the time duration can be decided by the base station based on the number of reflecting directions shared by the IRS controller.

As depicted in the example, the reflecting elements of the IRS panel can be grouped to reflect the signals or beams in a particular direction. As depicted in the example, the reflecting elements of the surface numbered as 1, 2, 3 and 4 form a group in which the beams are reflected for a first period of time (t1) specified by the base station in a particular direction. In the same manner other group of reflecting elements 5, 6, 7 and 8 can reflect beams for a second period of time (t2) for reflecting in a particular direction.

Figure 11:
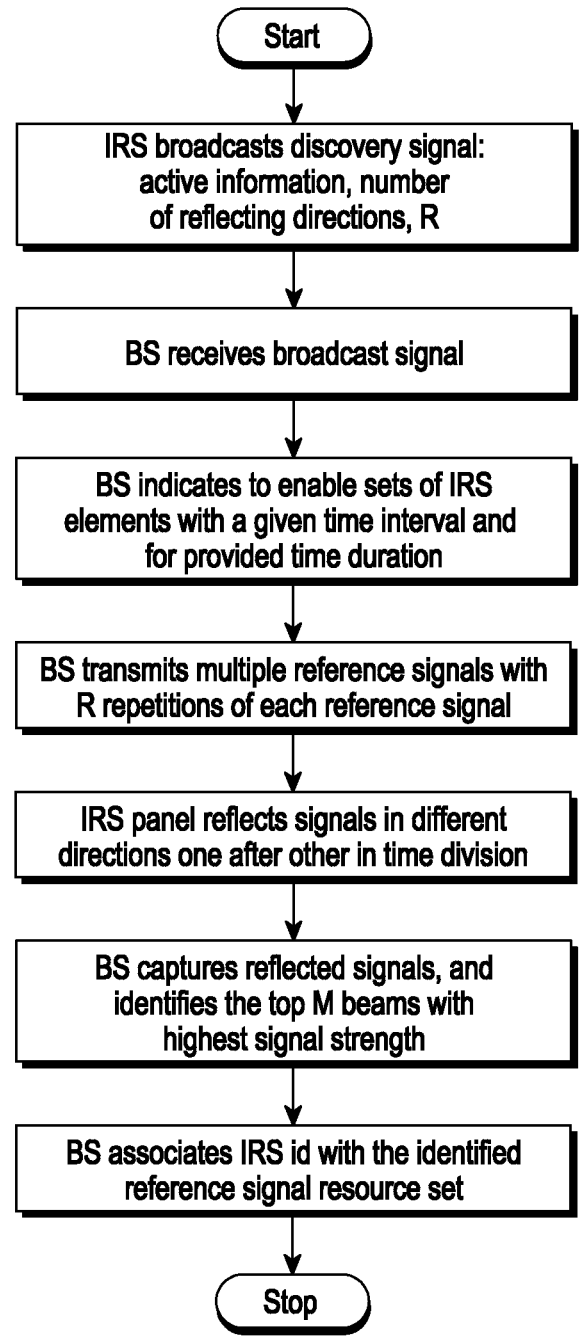
FIG. 11 is a flowchart illustrating example establishment of a connection with the intelligent reflecting surface (IRS) to the base station in a network, according to various embodiments.

FIG. 11 is a flowchart illustrating example establishment of a connection with the intelligent reflecting surface (IRS) to the base station in a network, according to embodiments as disclosed herein. As illustrated in FIG. 11, the base station, on receiving the discovery signal, can indicate the IRS to enable a set of IRS elements for a pre-defined time interval with the specified time duration.

The base station can transmit multiple reference signals denoted by "R" indicating the repetition of each reference signals. IRS can be configured to have total number of "R" reflecting directions, with each reference signal having to be transmitted R times. Thus, the repetition of the same reference signals can be multiplexed in the time domain.

The IRS panel can reflect the signals in different directions one after the other in time division manner. Hence, the total transmission of all reference signals can be repeated for a maximum of "N" number of times to identify the direction of IRS panel.

The base station 102 can capture reflected signals from the IRS to identify the beams with the maximum signal strength represented by "M". Therefore, the periodicity can be transmitted by the base station 102 to the IRS using the parameters M, N and R. Further, the base station can associate the IRS id with the identified reference signals resource set.

Figure 12:
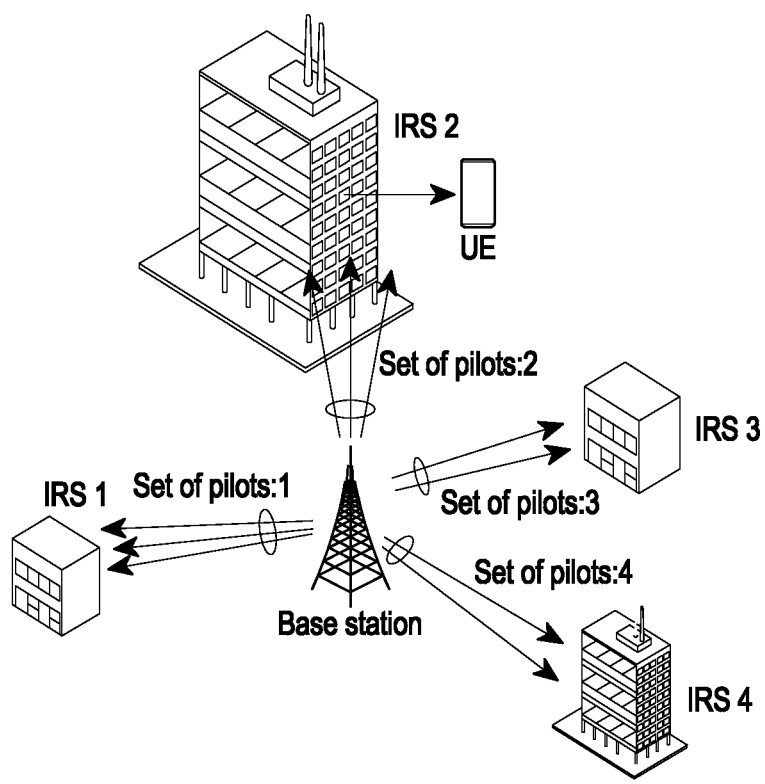
FIG. 12 is a diagram illustrating example association of the IRS with the pilot signals, according to various embodiments.

FIG. 12 is a diagram illustrating example association of the IRS with the pilot signals, according to embodiments as disclosed herein. In an embodiment, a plurality of IRS panels can be installed on multiple buildings or any infrastructure that can be identified using the identification number by the base station. The base station can be configured to associate each IRS with one or set of reference signals such as SSB, CSI or a set of new reference signals such as positioning or directional reference signals. The base station 102 can associate multiple IRSs 104 based on the position and direction of the reference signals transmitted by each of the IRSs.

For an example, the IRS 104 can be associated with a set of CSI reference signal as follows:

$IRS_1$—{$CSIRS_i$, $CSIR_{i+1}$, ... }
$IRS_2$—{$CSIRS_j$, $CSIR_{j+1}$, ... }
$IRS_N$—{$CSIR_k$, $CSIR_{k+1}$, ... }

The base station 102 can be configured to request the IRS controller 310 to enable all the sets of reflecting elements of the IRS panel one by one based on time division manner for a given time period. The base station 102 can communicate with the IRS using pre-defined radio. The time period for transmitting reference signals can be decided by the base station based on the number of IRS panels, and the number of reflecting directions shared by the IRS controller 310 in the discovery signals.

The user equipment 106 can be configured by the base station 102 for measuring the set of reference signals or pilot signals associated with each IRS through CSI-measconfig. The base station can configure the UE for RSRP and SINR report for the sets of pilots or reference signals associated with the IRS through CSI-reportconfig.

Figure 13:
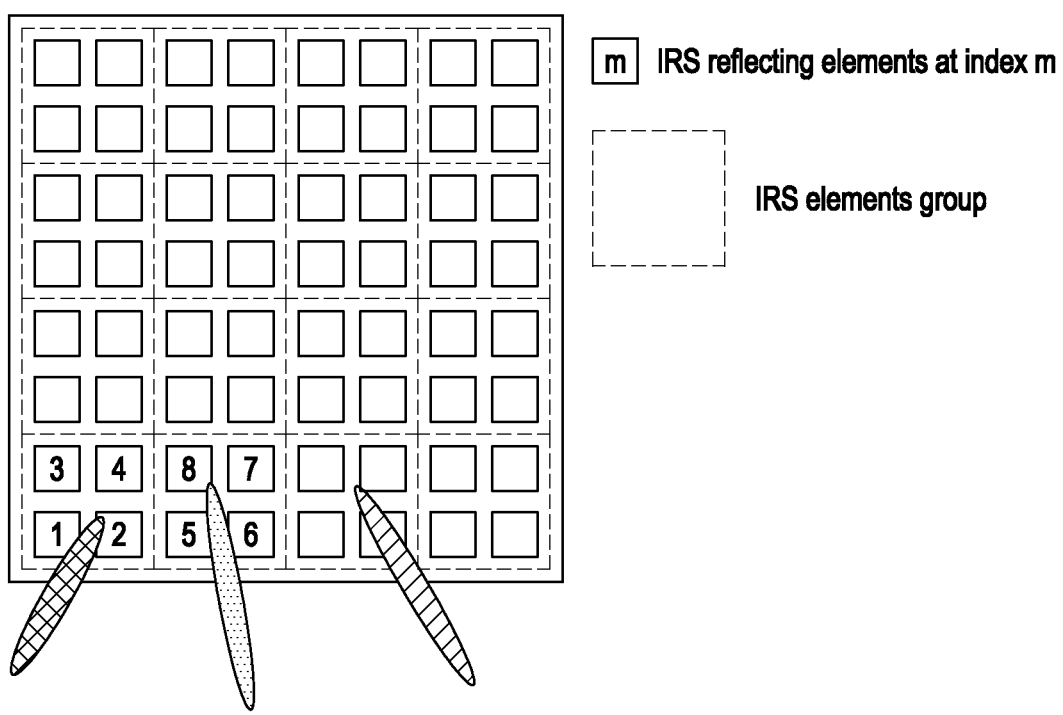
FIG. 13 is a diagram illustrating an example IRS panel reflecting in different directions from different groups of reflecting elements, according to various embodiments.

FIG. 13 is a diagram illustrating an example IRS panel reflecting in different directions from different groups of reflecting elements, according to various embodiments. As depicted in the example, the reflecting elements of the IRS panel can be grouped to reflect the signals or beams in a particular direction.

As depicted in the example, the reflecting elements of the surface numbered as 1, 2, 3 and 4 form a group in which the beams are reflected for a first period of time (t1) specified by the base station in a particular direction. In the same manner other group of reflecting elements 5, 6, 7 and 8 can reflect beams for a second period of time (t2) for reflecting in a particular direction.

Therefore, in the same manner, the reflecting elements form a group in which the beams are reflected for a pre-defined period of time in a particular direction notified by the base station 102. Also, the reflecting elements of the IRS panel in the group can reflect in all specified directions based on time division manner for a period of time specified by the base station. Hence, the time duration can be decided by the base station based on the number of reflecting directions notified by the IRS controller in the discovery signal.

Figure 14:
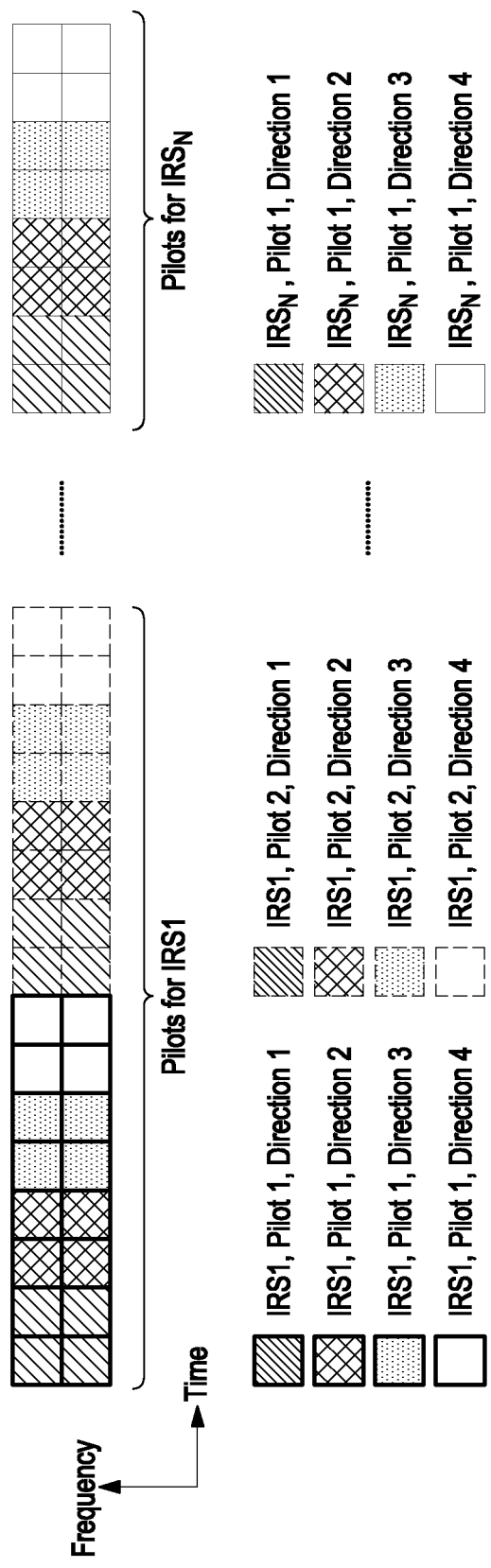
FIG. 14 is a diagram illustrating example transmission of IRS associated reference signals or pilot signals by the IRS, according to various embodiments.

FIG. 14 is a diagram illustrating example transmission of IRS associated reference signals or pilot signals by the IRS, according to various embodiments. As illustrated in FIG. 14, reference signals, beams, pilot beams to be transmitted in the direction specified by the base station are in same direction. The transmitted signals from the base station can be reflected in different directions by the IRS, which can be multiplexed in time domain.

The pilot signals can be transmitted in different directions for the same IRS, and the reference signals can be associated with different IRS panel can be multiplexed in a time domain. The reference signals can be multiplexed such that it can be transmitted and received over a common signal path by means of synchronizing the switches at each end of transmission line so that each signal appears as an individual one. This can transmit two or more signals over a common channel.

In an example as illustrated in FIG. 14, the direction of each pilot signals to be transmitted for the corresponding IRS have been illustrated in time and frequency graph. As illustrated in the example, the direction of first pilot beam ($pilot_1$) to be transmitted in the first direction ($direction_1$) for $IRS_1$, the direction of first pilot beam ($pilot_1$) can be transmitted in the second direction ($direction_2$) for $IRS_1$ till the $N^{th}$ pilot beam ($pilot_n$) to be transmitted in the $N^{th}$ direction ($direction_n$) for the $N^{th}$ IRS ($IRS_n$) and the like is shown. As illustrated, the corresponding pilots to be transmitted in corresponding direction for specific IRS can be illustrated. Each pilot beams can be transmitted in different direction for corresponding IRS.

In an embodiment, the direction in which the pilot signal has to be transmitted for the corresponding IRS can be represented by $IRS_n$, $pilot_n$, $direction_n$. It may be represented in $IRS_1$, $pilot_1$, $direction_1$ to $IRS_n$, $pilot_n$, $direction_n$. Thus, the reference singles or pilot beams can be multiplexed in the time domain to be transmitted to the corresponding IRS.

Figure 15:
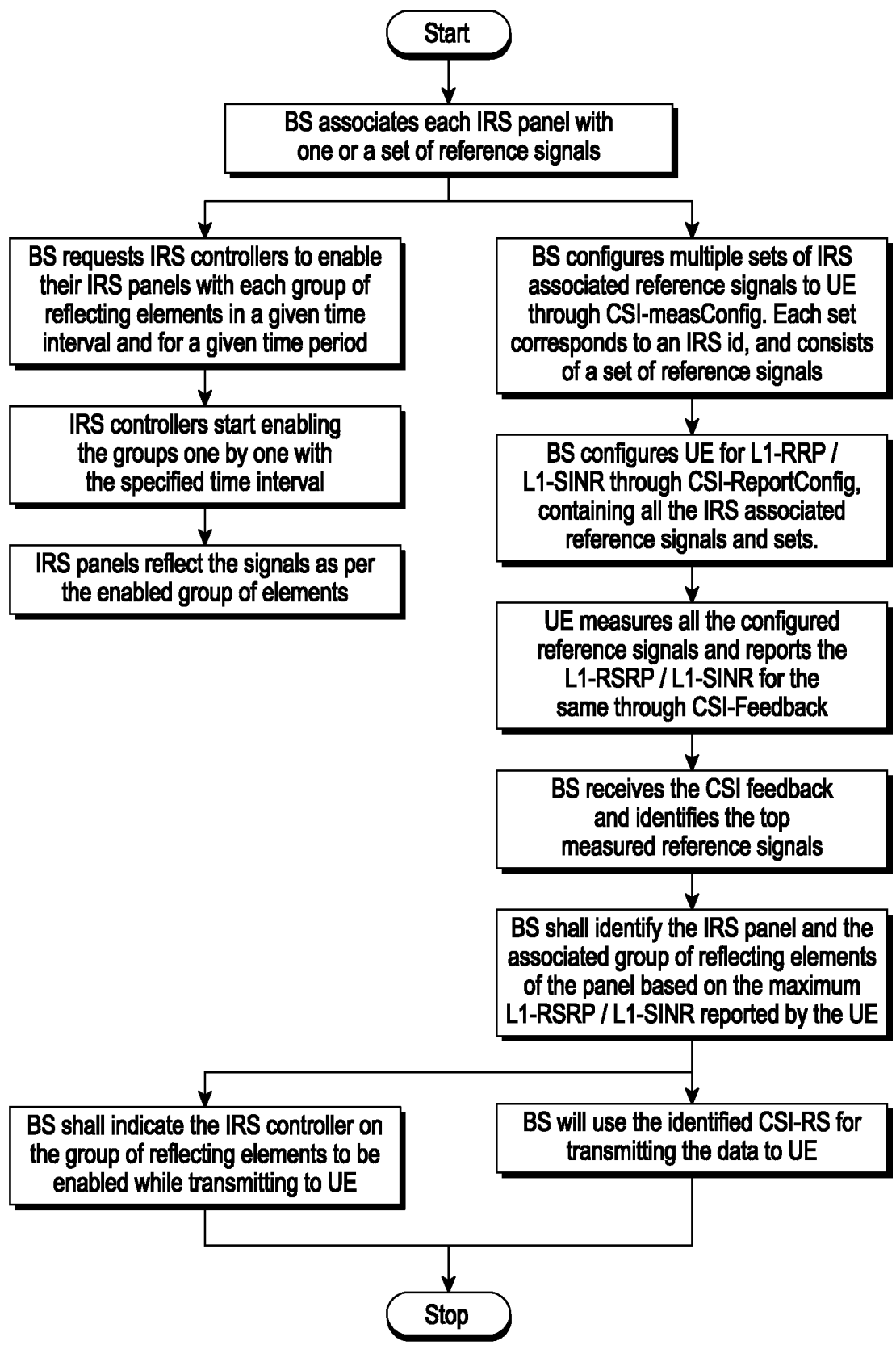
FIG. 15 is a flowchart illustrating example association of the intelligent reflecting surface (IRS) with the user equipment (UE), according to various embodiments.

FIG. 15 is a flowchart illustrating example association of the intelligent reflecting surface (IRS) with the user equipment (UE), according to embodiments as disclosed herein. As illustrated in the flow chart, the base station 102 can be associated with corresponding IRS panel with one or a set of reference signals.

The base station 102 can configure multiple sets of IRS associated reference signals to the UE using the component CSI-measconfig for measuring the set of pilots or reference signals associated with each of the IRS. The base station 102 can configure the UE for SINR with the sets of pilots or reference signals associated with the IRS through the component CSI-reportconfig, comprising all the IRS associated reference signals and the beams.

Further, the UE can be configured to measure all the configured reference signals and reports the RSRP/SINR through CSI-feedback. The UE can send the measurement report to the base station for associating the UE to the IRS. The CSI-reportconfig component can be used to send a report of the measured parameters to the network or to any connecting devices.

The base station can be configured to receive CSI feedback and can identify the measured reference signal with the maximum strength.

The base station can be configured to identify the IRS panel and the associated group of reflecting elements of the panel based on the identified maximum reference signals (RSRP and SINR) reported by the UE.

The base station can request the IRS controller to enable the corresponding IRS panels with the groups of reflecting elements one by one in a specified time intervals. Therefore, the IRS panels can be configured to reflect signals based on the enables group of reflecting elements of IRS.

Therefore, the base station can be configured to identify the reference signal for transmitting data to the UE. Also, the base station 102 can indicate the IRS controller on the group of reflecting elements to be enabled while transmitting to the UE.

Figure 16:
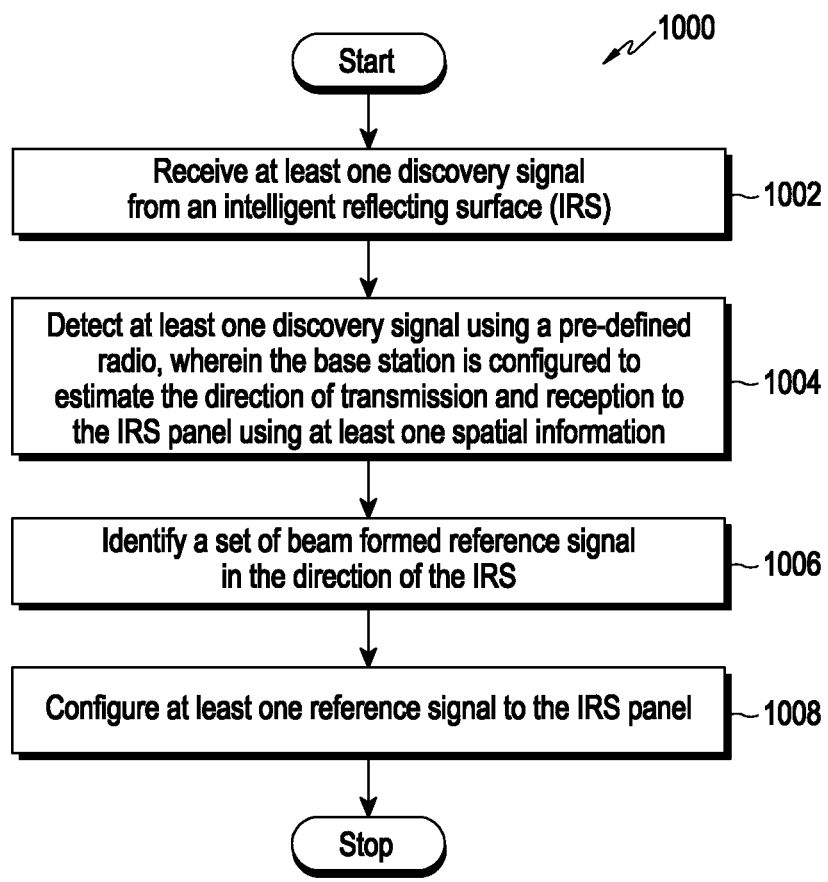
FIG. 16 is a flowchart illustrating an example method for configuring the intelligent reflecting surface (IRS) with the base station, according to various embodiments as disclosed herein.

FIG. 16 is a flowchart illustrating an example method for configuring the intelligent reflecting surface (IRS) with the base station, according to various embodiments.

At operation 1002, the method includes, receiving, by the base station, at least one discovery signal from the IRS.

At operation 1004, the method includes, detecting, by the base station (102), at least one discovery signal using a pre-defined radio, wherein the base station estimates the direction of transmission and reception to the IRS panel using at least one spatial information.

At operation 1006, the method includes, identifying, by the base station, a set of beam formed reference signals in the direction of the IRS; and At operation 1008, the method includes, configuring by the base station at least one reference signal to the IRS panel.

The various actions, acts, blocks, steps, or the like in the method and the flow diagram 1000 may be performed in the order presented, in a different order or simultaneously. Further, in various embodiments, some of the actions, acts, blocks, steps, or the like may be omitted, added, modified, skipped, or the like without departing from the scope of the disclosure.

Figure 17:
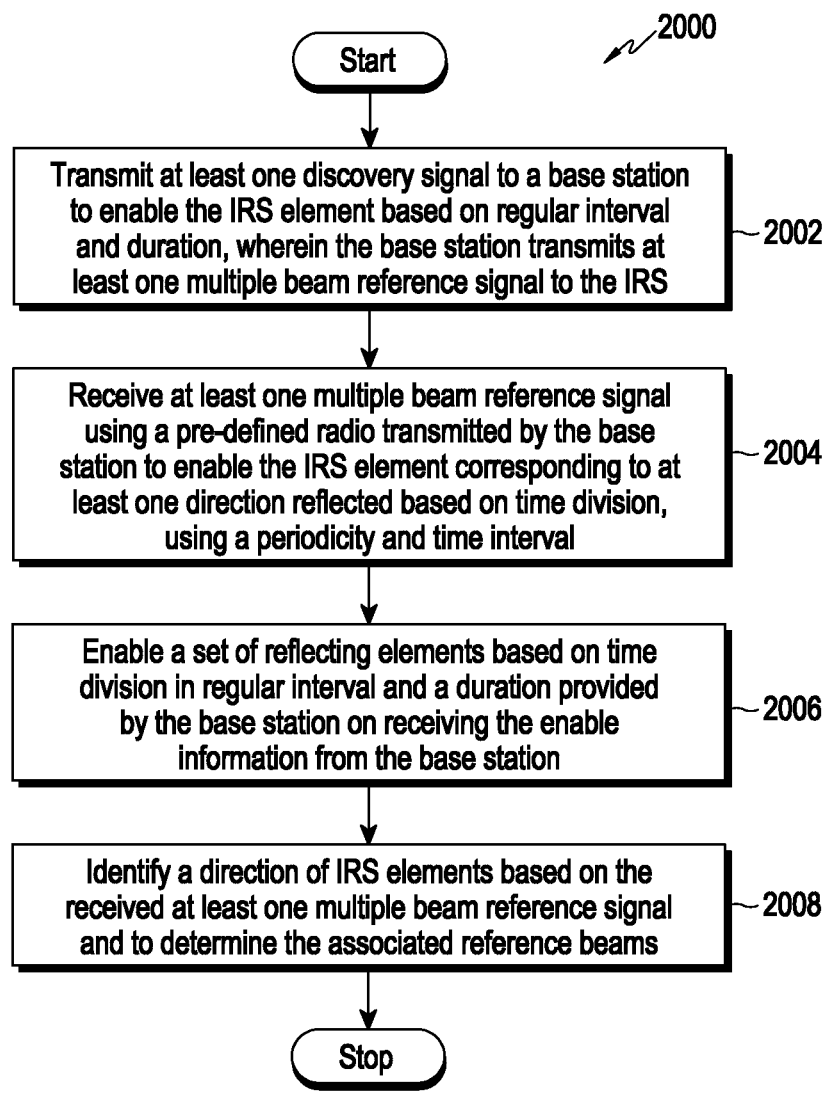
FIG. 17 is a flowchart illustrating an example method for enabling the intelligent reflecting surface element to the base station, according to various embodiments.

FIG. 17 is a flowchart illustrating an example method for enabling the intelligent reflecting surface element to the base station, according to various embodiments.

At operation 2002, the method includes, transmitting, by the IRS (104), at least one discovery signal to a base station (102) to enable the IRS element based on regular interval and duration, wherein the base station (102) transmits at least one multiple beam reference signal to the IRS.

At operation 2004, the method includes, receiving, by the IRS (104), at least one multiple beam reference signal using a pre-defined radio from the base station (102) to enable the IRS element corresponding to at least one direction reflected based on time division, using a periodicity and time interval.

At operation 2006, the method includes, enabling, by the IRS (104), a set of reflecting elements based on time division in regular interval and a duration provided by the base station (102), on receiving the enable information from the base station; and At operation 2008, the method includes, identifying, by the IRS (104), a direction of IRS element based on the received at least one multiple beam reference signal and to determine the associated reference beams.

The various actions, acts, blocks, steps, or the like in the method and the flow diagram 2000 may be performed in the order presented, in a different order or simultaneously. Further, in various embodiments, some of the actions, acts, blocks, steps, or the like may be omitted, added, modified, skipped, or the like without departing from the scope of the disclosure.

Figure 18:
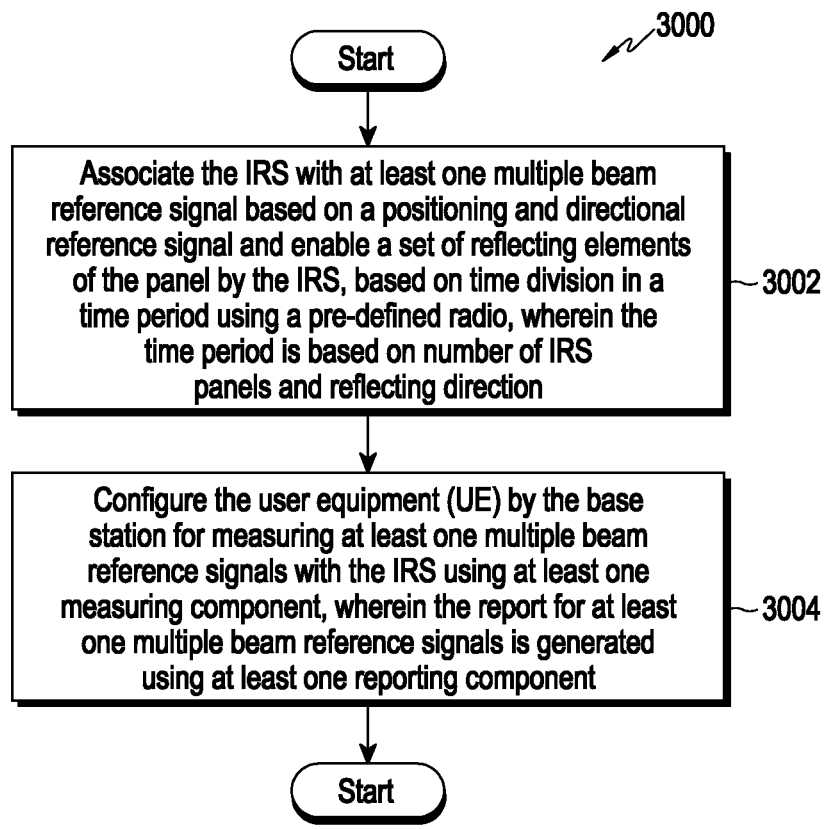
FIG. 18 is a flowchart illustrating an example method for configuring the user equipment (UE) to the intelligent reflecting surface, according to various embodiments.

FIG. 18 is a flowchart illustrating an example method for configuring the user equipment (UE) to the intelligent reflecting surface, according to various embodiments.

At operation 3002, the method includes, associating, by a base station (102), the IRS with at least one multiple beam reference signal based on a positioning and directional reference signals and enabling a set of reflecting elements of the panel by the IRS, based on time division in a time period using a pre-defined radio, wherein the time period is based on number of IRS panels and reflecting direction.

At operation 3004, the method includes, configuring, by the base station (102), an user equipment (UE) (106) for measuring at least one multiple beam reference signals with the IRS (104) using at least one measuring component, wherein the report for at least one multiple beam reference signals is generated using at least one reporting component.

The various actions, acts, blocks, steps, or the like in the method and the flow diagram 3000 may be performed in the order presented, in a different order or simultaneously. Further, in various embodiments, some of the actions, acts, blocks, steps, or the like may be omitted, added, modified, skipped, or the like without departing from the scope of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for configuring a reflecting surface by a base station, the method comprising:
receiving at least one discovery signal from the reflecting surface;
estimating a direction of a panel of the reflecting surface for transmission and reception based on the received at least one discovery signal;
providing the reflecting surface with a periodicity and a time interval for transmitting a set of beam formed reference signals;
transmitting the set of beam formed reference signals transmitted in the estimated direction of the panel of the reflecting surface, based on the periodicity and the time interval; and
receiving at least one reference signal from a plurality of reference signals which is reflected by the panel of the reflecting surface in multiple directions from the transmitted set of beam formed reference signals based on the periodicity and the time interval.

2. The method of claim 1, wherein the at least one discovery signal comprises at least one of location information of the reflecting surface, height and orientation of the panel of the reflecting surface, number of reflecting elements, and number of reflecting directions on the reflecting surface to reflect the base station using a specified radio,
wherein the base station identifies the direction of the panel based on at least one of the location information of the reflecting surface, location information of the base station, associated at least one beam formed reference signal from a location of the reflecting surface, and the height and the orientation of the panel of the reflecting surface.

3. The method of claim 1, wherein the set of beam formed reference signals is identified based on direction and positioning of the base station from the reflecting surface.

4. The method of claim 1, wherein the direction of the panel of the reflecting surface is estimated based on spatial information comprising a location, and coordinates with height and orientation of the base station relative to the reflecting surface.

5. The method of claim 1, further comprising:
associating the reflecting surface with at least one beam formed reference signal; and
enabling a set of reflecting elements of the reflecting surface, based on time division in a time period, wherein the time period is based on number of reflecting surface panels and reflecting direction;
configuring a user equipment (UE) for measuring the at least one beam formed reference signal through the reflecting surface; and
receiving a report for the at least one beam formed reference signal from the UE.

6. A method for configuring a reflecting element of a reflecting surface by the reflecting surface, the method comprising: broadcasting at least one discovery signal; receiving, in response to the broadcasted at least one discovery signal, a periodicity and a time interval for receiving a set of beam formed reference signals and the set of beam formed reference signals from a base station; enabling at least one reflecting element of a plurality of reflecting elements of the reflecting surface to reflect the received set of beam formed reference signals from the base station in multiple directions based on the periodicity and the time interval, wherein at least one of the received set of beam formed reference signals is reflected by the at least one reflecting element back towards the base station; and identifying a direction of each of the at least one reflecting element based on the received set of beam formed reference signals.

7. The method of claim 6, wherein enabling the at least one reflecting element comprises enabling the at least one reflecting element to reflect in at least one direction based on time division.

8. The method of claim 6, further comprising:
reflecting, using the at least one reflecting element, the set of beam formed reference signals received in different directions based on time division,
wherein at least one of the reflected set of beam formed reference signals is received by the base station in at least one transmitted direction of the set of beam formed reference signals.

9. The method of claim 8, wherein one or more beams corresponding to one or more of the reflected set of beam formed reference signals having a maximum signal strength is identified, by the base station, as a set of the beams associated with the reflecting surface.

10. The method of claim 6, wherein the periodicity depends on a number of the set of beam formed reference signals, a number of transmitted beams in reflecting directions, and a maximum number of transmissions to identify a direction of a panel of the reflecting surface.

11. A base station for configuring a reflecting surface comprising:
a transceiver; and
a controller coupled to the transceiver, wherein the controller is configured to:
receive at least one discovery signal from the reflecting surface;
estimate a direction of a panel of the reflecting surface for transmission and reception based on the received at least one discovery signal;
provide the reflecting surface with a periodicity and a time interval for transmitting a set of beam formed reference signals;
transmit the set of beam formed reference signals transmitted in the direction of the panel of the reflecting surface, based on the periodicity and the time interval; and
receive at least one reference signal from a plurality of reference signals which is reflected by the panel of the reflecting surface in multiple directions from the transmitted set of beam formed reference signals based on the periodicity and the time interval.

12. The base station of claim 11, wherein the at least one discovery signal comprises at least one of location information of the reflecting surface, height and orientation of the panel of the reflecting surface, number of reflecting elements, and number of reflecting directions on the reflecting surface to reflect the base station using a specified radio,
wherein the base station identifies the direction of the panel based on at least one of the location information of the reflecting surface, location information of the base station, associated at least one beam formed reference signal from a location of the reflecting surface, and the height and the orientation of the panel of the reflecting surface.

13. The base station of claim 11, wherein the controller is configured to identify the set of beam formed reference signals from the reflecting surface, based on direction and positioning of the base station from the reflecting surface.

14. The base station of claim 11, wherein the direction of the panel of the reflecting surface is estimated based on spatial information comprising a location, and coordinates with height and orientation of the base station relative to the reflecting surface.

15. The base station of claim 11, wherein the controller is further configured to:
associate the reflecting surface with at least one beam formed reference signal; and
enable a set of reflecting elements of the reflecting surface, based on time division in a time period, wherein the time period is based on number of reflecting surface panels and reflecting direction;
configure a user equipment (UE) for measuring the at least one beam formed reference signal through the reflecting surface; and
receive a report for the at least one beam formed reference signal from the UE.

16. A reflecting surface comprising: a transceiver; and a controller coupled to the transceiver, wherein the controller is configured to: broadcast at least one discovery signal; receive, in response to the broadcasted at least one discovery signal, a periodicity and a time interval for receiving a set of beam formed reference signals and the set of beam formed reference signals from a base station; enable at least one reflecting element of a plurality of reflecting elements of the reflecting surface to reflect the received set of beam formed reference signals from the base station in multiple directions based on the periodicity and the time interval, wherein at least one of the received set of beam formed reference signals is reflected by the at least one reflecting element back towards the base station; and identify a direction of each of the at least one reflecting element based on the received set of beam formed reference signals.

17. The reflecting surface of claim 16, wherein the controller is configured to enables the at least one reflecting element to reflect in at least one direction based on time division.

18. The reflecting surface of claim 16, wherein the controller is further configured to reflect, using the at least one reflecting element, the set of beam formed reference signals received in different directions based on time division, and
wherein the reflected set of beam formed reference signals is received by the base station in at least one transmitted direction of the received set of beam formed reference signals.

19. The reflecting surface of claim 16, wherein one or more beams corresponding to one or more of the reflected set of beam formed reference signals having a maximum signal strength is identified, by the base station, as a set of the beams associated with the reflecting surface.

20. The reflecting surface of claim 16, wherein the periodicity depends on a number of beams in the set of beam formed reference signals transmitted from the base station, a number of transmitted beams in reflecting directions, a maximum number of transmissions to identify a direction of a panel of the reflecting surface.

* * * * *